C. G. SWEBILIUS & H. T. R. HANITZ.
REPEATING FIREARM.
APPLICATION FILED JAN. 12, 1914.
1,105,467.
Patented July 28, 1914
5 SHEETS—SHEET 4.
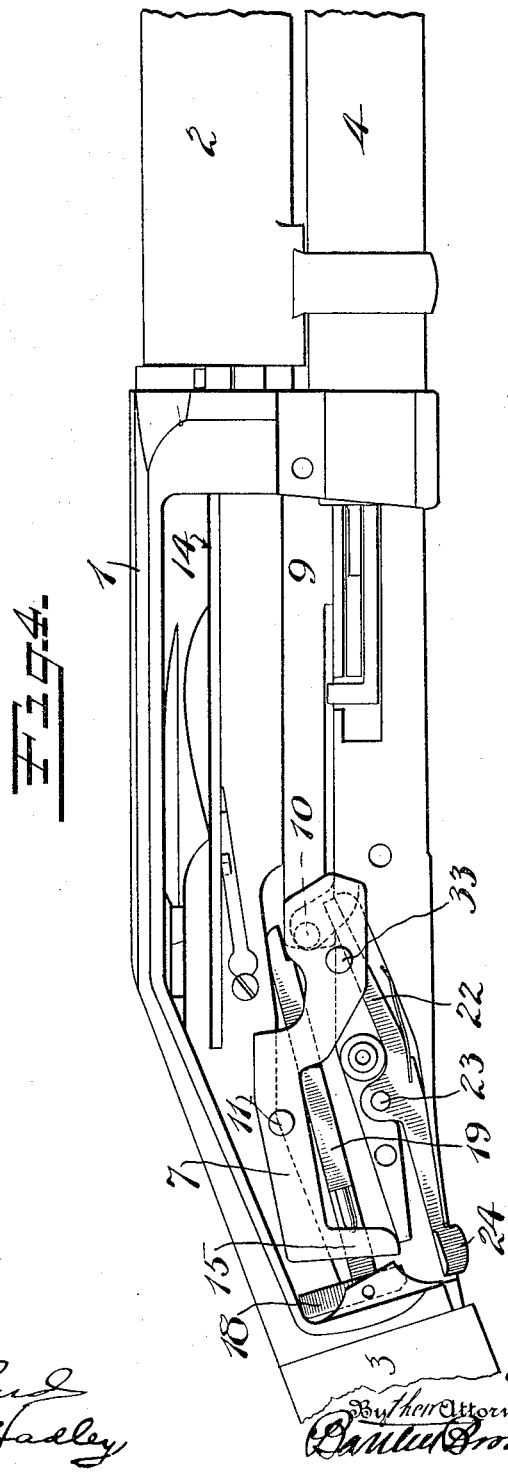

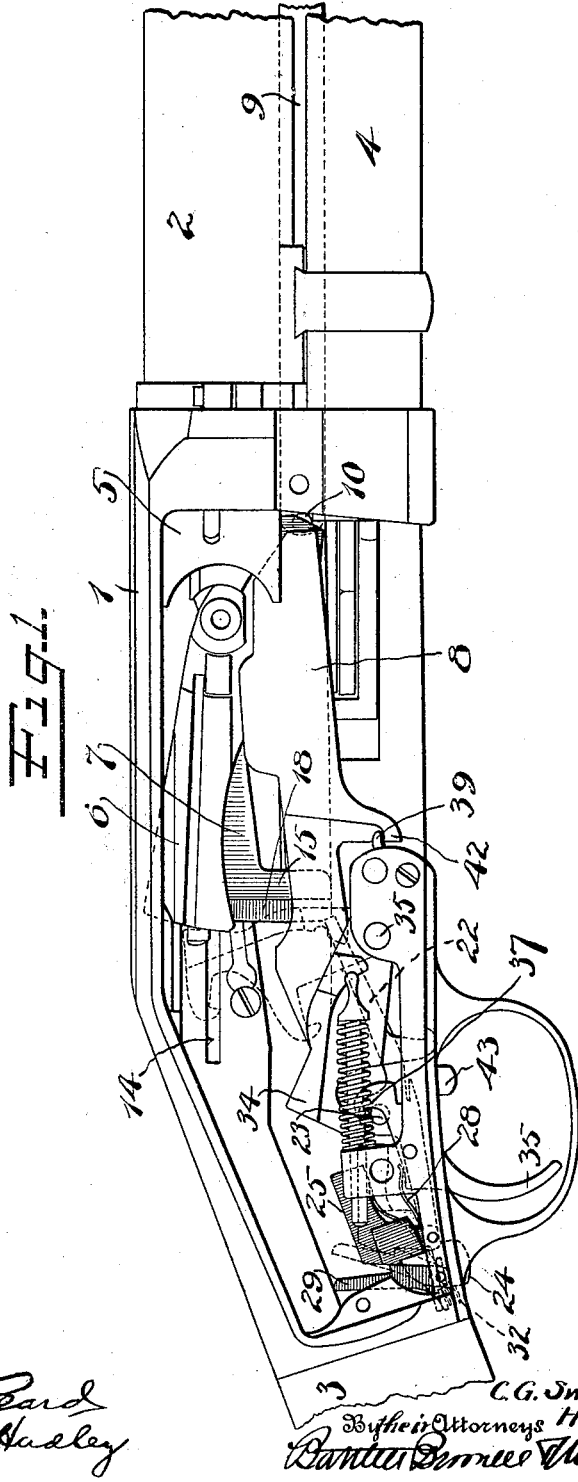

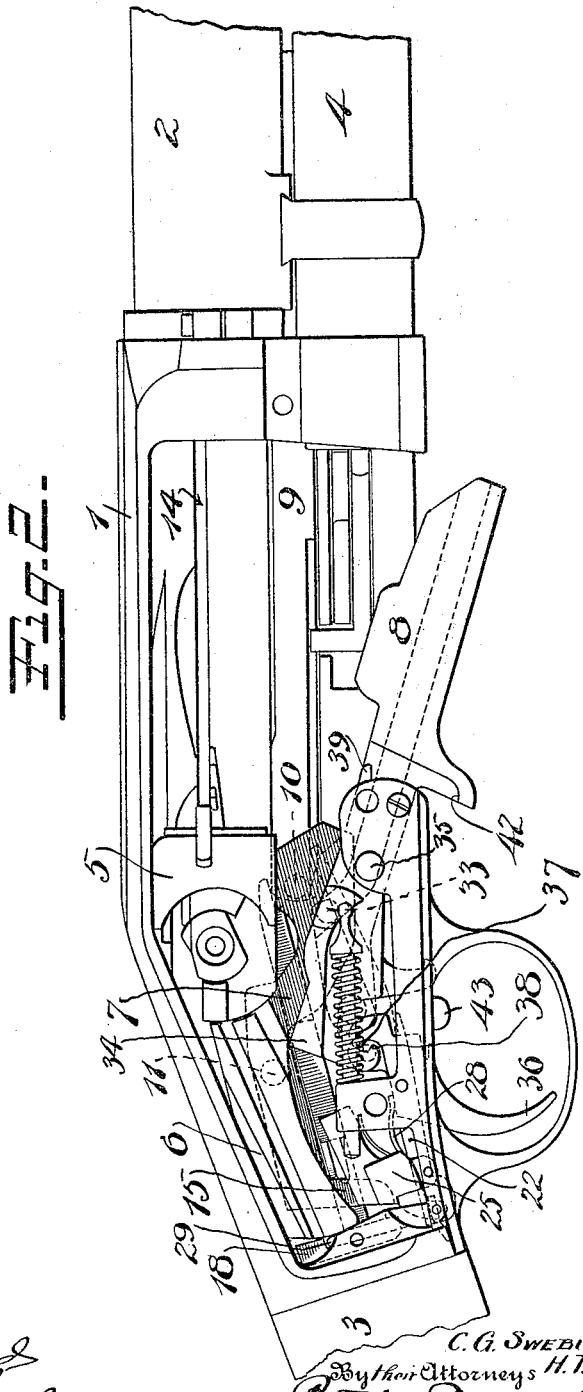

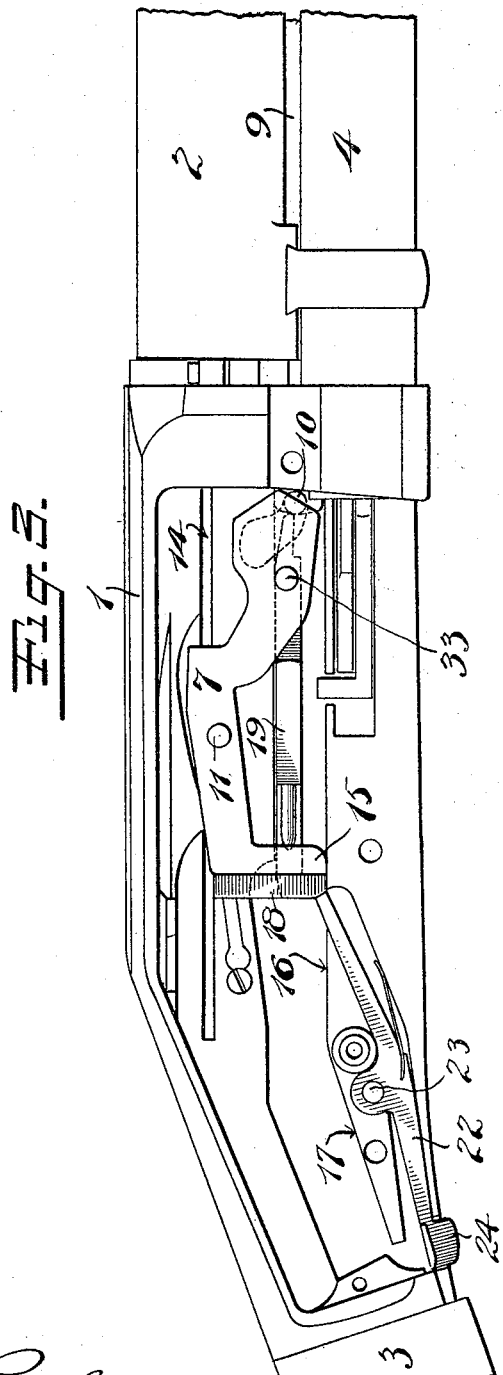

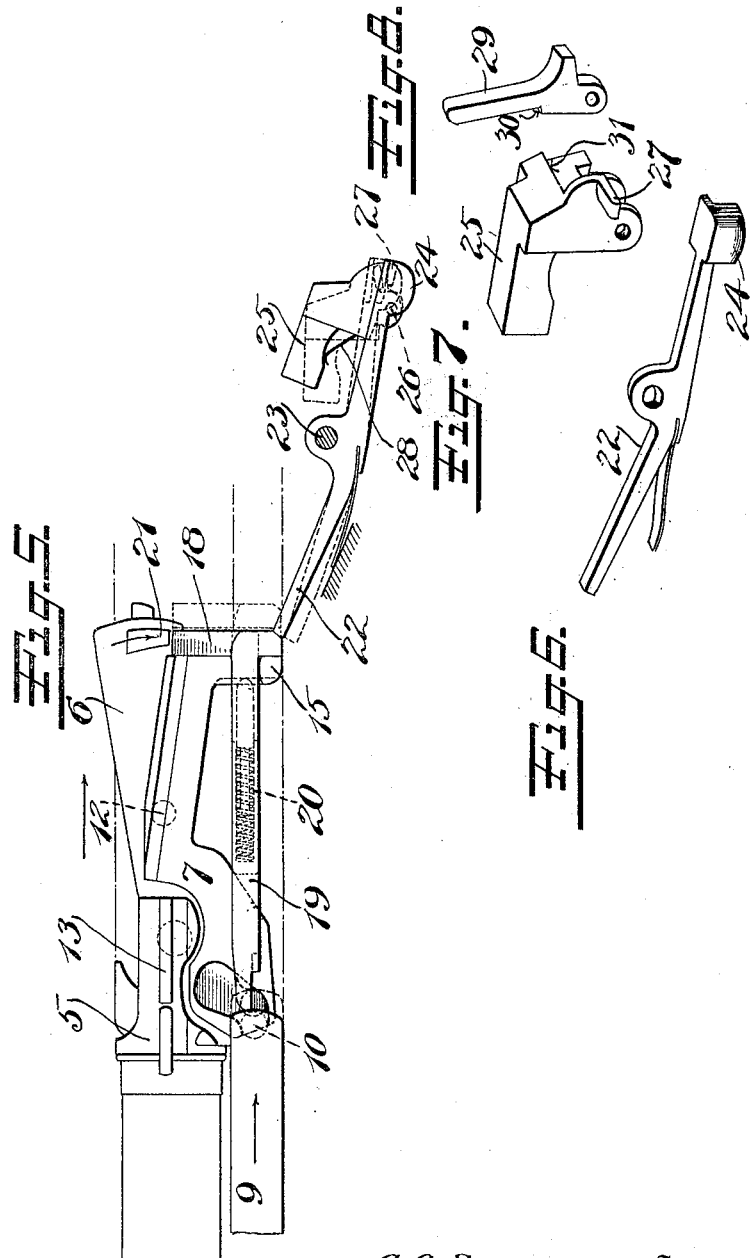

UNITED STATES PATENT OFFICE.

CARL GUSTAF SWEBILIUS AND HANS T. R. HANITZ, OF NEW HAVEN, CONNECTICUT, ASSIGNORS TO THE MARLIN FIREARMS COMPANY, OF NEW HAVEN, CONNECTICUT, A CORPORATION OF CONNECTICUT.

REPEATING FIREARM.

1,105,467.  Specification of Letters Patent.  Patented July 28, 1914.

Application filed January 12, 1914. Serial No. 811,517.

*To all whom it may concern:*

Be it known that we, CARL GUSTAF SWEBILIUS and HANS T. R. HANITZ, a citizen of the United States and a subject of the Emperor of Germany, respectively, residing at New Haven, New Haven county, State of Connecticut, have invented certain new and useful Improvements in Repeating Firearms, of which the following is a full, clear, and exact description.

Our invention relates to an improvement in repeating firearms, particularly of the hammerless variety, the object of the invention being to provide various improvements in a magazine firearm such as set forth in United States Letters Patent No. 943,828 to Louis L. Hepburn, dated December 21st, 1909, said improvements being hereinafter referred to, all of which will be readily understood by the mechanic skilled in the art from a reading of the following description and an examination of the accompanying drawings, in which, Figure 1 is a side elevation of a gun constructed to embody our invention, the side plate being removed and the various parts being shown in closed or locked up position with the gun ready to be fired. Fig. 2 is a similar view, the parts being shown in a different position, the breech block being fully retracted. Fig. 3 is a view similar to Fig. 1 with certain parts removed. Fig. 4 is a view similar to Fig. 2 with certain parts removed. Fig. 5 is a reverse view of certain parts shown in Fig. 1. Figs. 6, 7 and 8 are perspective views of details.

1 represents the receiver or breech frame.
2 represents the barrel.
3 represents the stock.
4 represents the magazine.
5 represents the breech block.
6 represents the locking bolt pivoted at the rear of the breech block 5 to move up and down, the upper end of the locking bolt being arranged to move into a notch in the overhanging wall of the receiver after the manner indicated in dotted lines Fig. 1 to lock the breech block 5 in its advanced position.

7 represents a link by which the locking bolt is tilted in the manner hereinafter described.

8 represents the cartridge carrier pivotally mounted in the receiver to move up and down from the extreme position indicated in Fig. 1 to that indicated in Fig. 2, and vice versa.

9 represents the action rod, the firearm being of the so-called "pump action" type. The action rod has a stud 10 at its rear end which is arranged to extend into a cam groove in the side of the forward end of the locking bolt link 7, which link partakes of a relative rocking movement on its stud 11, the stud 11 projecting into a hole of corresponding size in the side of the locking bolt, as indicated in dotted lines at 12, Fig. 5. The breech block has a longitudinal rib 13 on its side which moves in a longitudinal groove 14 in the adjacent side of the receiver which guarantees a straight line movement to the breech block head. The rear end of the link 7 has a downward projection 15 which rides along a ledge on the inner side of the receiver, part of the ledge being flat as indicated at 16, Fig. 3, and part inclining downwardly to the rear as indicated at 17. The rear end 15 of the link 7 constitutes, therefore, the fulcrum point, the front end being elevated and depressed by the action of the stud 10 in the cam slot at the forward end of the link 7. Briefly describing the action of this link, the locking bolt and breech block: It will be seen that the rearward movement of the action rod will first cause the forward end of the link 7 to swing down. This movement will simultaneously swing down the locking bolt 6, freeing its upper end from the recess in the top wall of the receiver, unlocking the breech block. A further rearward movement of the action rod will cause the breech block locking bolt and link 7 to move rearwardly, the tail end 15 of the link running along the supporting ledge first along the part 16 and then down the incline 17. Incidental to this movement a certain safety device is operated which will now be described.

18 is a movable stop shoulder mounted vertically at the rear end of the link 7. This stop shoulder has a forwardly projecting rod 19 which is pressed by a spring 20 in a forward direction. The forward end of this rod 19 stands directly to the rear of the rear end of the action rod 9 (see Fig. 5) so that the first movement of the action rod rearwardly will be to move the rod back and to shift the position of the stop shoulder 18 from that shown in solid lines Fig. 5 to that shown in dotted lines in the same figure. On the side of the locking bolt 6 will be seen a laterally projecting shoulder 21 (see Fig. 5) which, when the breech mechanism is locked up, will stand as shown in Fig. 5 directly above the stop shoulder 18, hence until the stop shoulder 18 is moved back to the dotted position, the locking bolt cannot be swung down out of its locking position indicated in Fig. 5. When the gun is loaded ready for firing, the rearward movement of the action rod 9 is positively blocked by means of a stop lever 22 pivoted at 23 and capable of being automatically and manually controlled. The normal position of the lever 22 is to stand as shown in solid lines, Fig. 5, absolutely blocking the retraction of the stop shoulder 18. If, however, the lever 22 is tilted to the position indicated in dotted lines, it becomes freed from the stop shoulder 18, whereupon the action rod may be retracted. This constitutes a safety device to prevent the premature unlocking of the gun in the event the gun "hangs fire." If it is desired to open the gun to remove a loaded shell from the barrel, the lever 22 may be tilted by engagement with the finger, said lever having a projecting finger-piece 24. Again, this safety stop lever 22 performs the additional function of preventing any loose play fore and aft of the action rod 9, there being in many guns of the pump action type a limited amount of loose play even when the gun is locked up. When the gun is fired, it is desirable that this action rod should be automatically released, which action is accomplished preferably by means of an inertia block 25. This inertia block 25 is pivoted at 26 on some part of the frame and is provided with a laterally projecting arm 27 at a point to the rear of the block, which arm projects under the rear end of the lever 22 so that when the inertia block swings from the position shown in solid lines Fig. 5 to that shown in dotted lines, it will tilt the lever 22 and free the stop shoulder 18. The inertia block 25 normally stands in the position indicated in dotted lines in Fig. 5, being lightly supported in that position by any suitable means such, for example, as a spring 28. Obviously on a quick recoil of the gun the inertia block will rock on its pivot in a direction to swing the lever 22.

29 is a latch for the inertia piece. This latch is pivoted at its lower end and is provided with a latch shoulder 30 which is arranged to engage a shoulder 31 when the inertia piece is advanced to the position indicated in dotted lines, and hold the latter in this position until the latch is released in the manner hereinafter described. A suitable spring 32 may be provided to move the latch 29 in a direction to latch the inertia piece. When the gun is fully opened, the rear end of the locking bolt 6 will strike the upper end of the latch 29, as seen in Fig. 2, thus releasing the inertia piece so as to allow it to swing up to its normal position, releasing the rod 22 so that the latter will engage the stop shoulder 18 when the latter has been again advanced.

The firearm is, of course, provided with the usual cartridge extracting and ejecting means and is provided with appropriate cut-off mechanism for releasing the cartridges one by one from the magazine at the proper time. As to these specific devices, no claim of novelty is made herein, and since the same are well understood, it will be unnecessary to describe the construction or mode of operation of such devices.

The carrier 8 is operated in the same manner as set forth in the former Hepburn patent above referred to; that is to say, by means of a stud 33 on the side of the link 7 which projects into a cam groove in the side of the carrier, said cam groove being indicated in dotted lines, Fig. 2. As the link 7 moves to and fro, the carrier is depressed and elevated in the proper sequence with the movements of the other parts to take a cartridge from the elevation of the magazine and raise it into position in line with the barrel chamber and in front of the breech block ready to be forced into the chamber of the barrel on the forward movement of the action rod. When the parts are reciprocating by the action of the action rod, the stud 10 on the action rod will, of course, rest in the upper end of the cam-groove in the forward end of the link 7 and hence cannot be withdrawn therefrom even though the said groove is open at the lower end, which open-ended groove is necessary only when the gun is of the take-down variety which requires that the action rod shall be capable of being entirely withdrawn from the receiver before detaching the barrel from the receiver.

34 is a spring pressed hammer which is pivoted at 35 and which is of conventional form.

36 is the trigger which has a hook 37 arranged to engage a hook 38 on the hammer when the latter is cocked, the hammer being cocked by the locking bolt on the retraction of the parts. The hammer 34 is preferably provided with a suitable safety sear, the end of which is indicated at 39, the function of which is to engage the hammer and hold it in a slightly over-cocked position while the action mechanism is being operated, the said hammer sear 39 being released, for example, by a lug 42 on the carrier so as to free the sear from the hammer hub to allow the hammer to descend slightly so that it will be held alone by the trigger. In Fig. 2 the hammer appears in its over-cocked position, the sear 39 being in a position to engage the hub of the hammer. In Fig. 1 the carrier is shown as having tripped the sear 39 and the hammer is shown as having ascended slightly so that its hook will engage with the hook 37 of the trigger.

43 is the exposed part of the trigger safety device for manual operation, this trigger safety device being of any suitable construction, the purpose being to lock the trigger so that it cannot be pulled accidentally.

In operation: Starting with the parts as shown in Fig. 1, it will be seen that the parts of the gun are in position ready to be fired. When the trigger is pulled, the hammer descends and strikes the firing pin, which in turn strikes the loaded shell in the barrel 2 which is held therein positively by the breech block 5 and locking bolt 6. Even though the operator is pulling back upon the action rod 9, this rearward pressure does not disturb the position of the parts until after the cartridge is discharged because the stop lever 22 is blocking the stop shoulder 18. When, however, the shell is discharged, the recoil shifts the inertia block 25 so as to shift the stop lever 22 so that its forward end will become disengaged from the stop shoulder 18, whereupon the action rod 9 may be moved rearwardly. The first movement of the action rod moves the stop shoulder 18 back until it clears the laterally projecting shoulder 21 on the locking bolt (see Fig. 5). The continued rearward movement of the action rod 9 causes the forward end of the link 7 to swing downwardly so as to draw down the locking bolt 6 through the medium of the stud 11, thus unlocking the breech block and associated parts. The further rearward movement of the action rod 9 causes the breech block, locking bolt and link 7 to move rearwardly bodily, the rib 13 on the breech block following the groove 14 in the receiver frame, and the tail 15 of the link 7 following the ledge 16—17. The rearward movement of these parts operates the carrier through the medium of the stud 33. Incidental to this movement of the various parts of the breech mechanism, the extractor, ejector and magazine cut-off mechanism operate in the usual manner to cause the removal and ejection of the empty shell and the release of a single loaded shell from the magazine. The forward movement of the action rod carries forward the several parts of the breech mechanism bodily, lifts the carrier simultaneously so that the loaded shell carried thereby will be raised to its proper position in front of the breech block and forced into the chamber of the barrel. The final forward movement of the action rod causes the link 7 to tilt in a direction to lift the locking bolt 6 into the locking position. As soon as the parts of the gun are locked up, the stop shoulder 18 is projected by the spring 20 into the position indicated in solid lines in Fig. 5 so as to guarantee that the gun will remain locked until the cartridge is discharged. Simultaneously the lever 22 moves into position back of the stop shoulder 18 to hold said stop shoulder in the said position and to also hold the forward end of the rod 19 against the stud 10 of the action rod so that it will not have loose play. Incidental to the retraction of the parts, the latch 29 for the inertia block is cast off so that the inertia block can rise to its normal position indicated in solid lines Fig. 5, which movement allows the safety lever 22 to move into its locking position as soon as the gun is locked up.

It will be seen that the breech block and locking bolt constitute, in effect, one combined element, the part 5 constituting the head portion and the part 6 constituting the tail portion, said parts being hinged together so that the tail portion only will tilt in the locking operation. This it will be understood is merely a preferred construction.

What we claim is:

1. In a repeating firearm, a receiver, action mechanism therein including a combined breech block and locking bolt, an action rod operatively connected with said combined breech block and locking bolt, a safety locking lever coöperating with the action rod and combined breech block and locking bolt to hold said parts in the locked up position, with means for moving said safety locking lever to release said parts, said means being operable automatically by the recoil of the arm, and including a movable inertia block arranged to operatively engage said safety locking lever, with a latch for engaging said inertia block in the position in which it is caused to stand by the recoil of the gun, a part of said breech mechanism being arranged to cast off said latch to release the inertia block and means to automatically reset the latter in its normal position when the breech mechanism is retracted.

2. In a repeating firearm, a receiver, a combined breech block and locking bolt, the rear part of which is arranged to be moved into locking engagement with one of the walls of the receiver, an action rod, a movable link between the action rod and the breech locking end of the combined breech block and locking bolt, a movable stop shoulder carried by said link, a shoulder on the rear part of the combined breech block and locking bolt arranged to be blocked by said stop shoulder when the gun is locked up, and means normally operating to hold said stop shoulder in said blocking position while the gun is locked up.

3. In a repeating firearm, a receiver, a combined breech block and locking bolt, the rear part of which is arranged to be moved into locking engagement with one of the walls of the receiver, an action rod, a movable link between the action rod and the breech locking end of the combined breech block and locking bolt, a movable stop shoulder carried by said link, a shoulder on the rear part of the combined breech block and locking bolt arranged to be blocked by said stop shoulder when the gun is locked up, means normally operating to hold said stop shoulder in said blocking position while the gun is locked up, with means for automatically releasing said stop shoulder upon the discharge of the gun.

4. In a repeating firearm, a receiver, a combined breech block and locking bolt, the rear part of which is arranged to be moved into locking engagement with one of the walls of the receiver, an action rod, a movable link between the action rod and the breech locking end of the combined breech block and locking bolt, a movable stop shoulder carried by said link, a shoulder on the rear part of the combined breech block and locking bolt arranged to be blocked by said stop shoulder when the gun is locked up, means normally operating to hold said stop shoulder in said blocking position while the gun is locked up, with means for automatically releasing said stop shoulder upon the discharge of the gun, and with manually operable means for releasing said stop shoulder at any time.

5. In a repeating firearm, a receiver, a combined breech block and locking bolt including a head portion arranged for reciprocation only and a tail portion arranged to both reciprocate and oscillate, an abutment shoulder on the receiver arranged to be engaged by the tail portion of the combined breech block and locking bolt when the gun is locked up, a reciprocating action rod arranged to enter the front of the receiver for operating the aforesaid parts, a link connection between said action rod and the tail portion of said combined breech block and locking bolt, a supporting ledge having an inclined portion at its rear, the rear end of said link being supported by and movable upon said ledge, a stop shoulder carried by said link and movable therewith and relatively thereto, a connection between said stop shoulder and said action rod for permitting the first part of the rearward movement of the action rod to shift said stop shoulder, a shoulder on the tail portion of the breech block and locking bolt arranged to be blocked by said stop shoulder when the latter stands in its advanced position, means normally operating to hold said stop shoulder against movement when the gun is locked up, with means for casting off said safety locking lever upon the discharge of the gun.

CARL GUSTAF SWEBILIUS.
HANS T. R. HANITZ.

Witnesses:
F. E. BRADLEY,
WILLIAM C. MILLER.

---

Copies of this patent may be obtained for five cents each, by addressing the "Commissioner of Patents, Washington, D. C."